Figure 1:
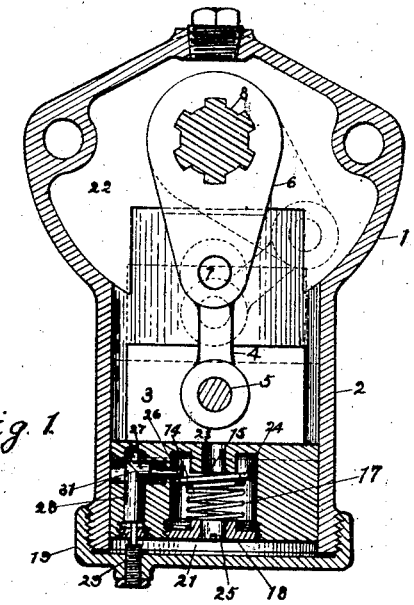

July 27, 1926.

H. O. FLETCHER

SHOCK ABSORBER

Filed March 19, 1923    2 Sheets-Sheet 1

1,594,008

WITNESSES:
Carl M Petersen
Stella W. Petersen

INVENTOR
Henry O. Fletcher.
BY

ATTORNEY

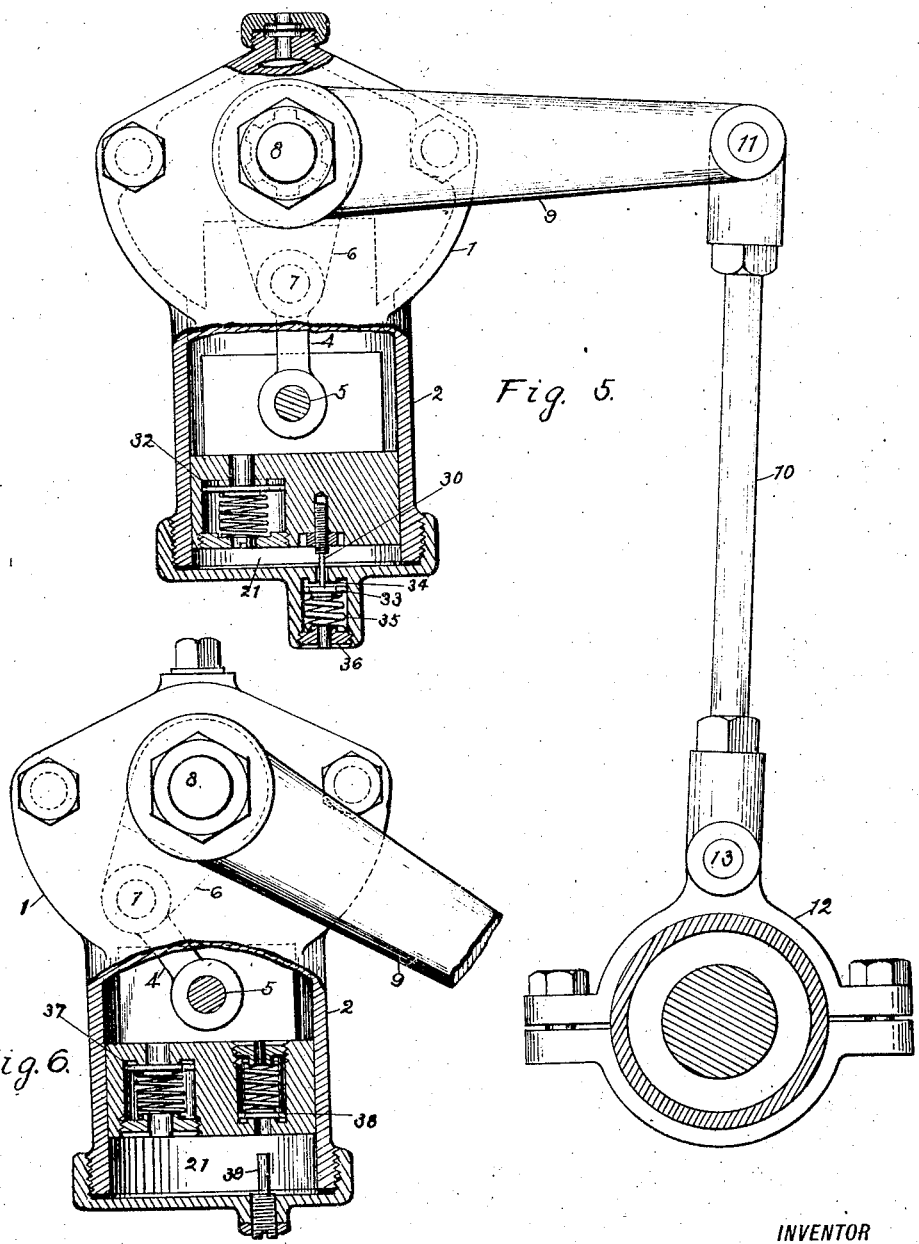

Patented July 27, 1926.

1,594,008

UNITED STATES PATENT OFFICE.

HENRY O. FLETCHER, OF BRIDGEPORT, CONNECTICUT.

SHOCK ABSORBER.

Application filed March 19, 1923. Serial No. 626,180.

One object of my invention is to produce an absorber requiring little or no care.

Another object is to secure a resilient check which eliminates sudden stresses in the working parts.

My present invention is a modification of my application, Serial Number 598,574, November 2, 1922, the main difference being that atmospheric air or a compressible fluid is used exclusively and the compressed fluid is released from the compression chamber near or at the end of the compression stroke.

In the drawings, like characters represent like parts.

Figure 3:
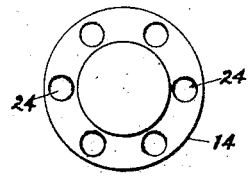
Figure 2:
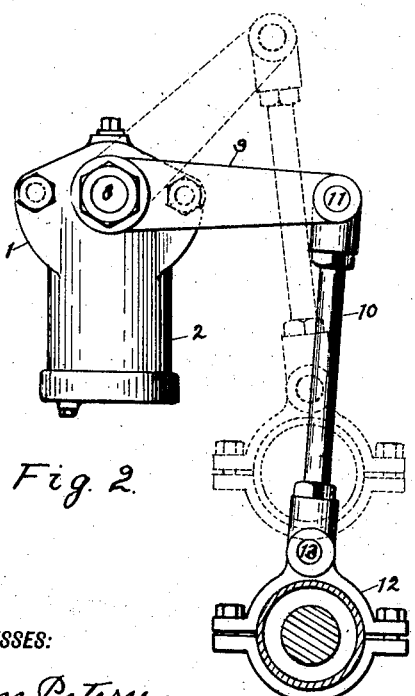
Figure 4:
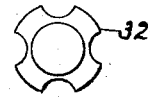

Fig. 1 is a side elevation showing one embodiment of my invention, parts being broken away for clearness of illustration. Fig. 2 is a side elevation showing the connection to the vehicle axle. Figs. 3 and 4 are detail plan views of the suction and relief valves respectively. Figs. 5 and 6 respectively are side elevations showing another embodiment of my invention, parts being broken away for clearness of illustration.

Referring more particularly to Fig. 1, the body or case 1, is adapted to be attached preferably to the body of a vehicle, and extending from it is the cylinder 2, forming a part of the same. The plunger or piston 3, is adapted to reciprocate in cylinder 2, and is actuated by link 4, which is pivotally connected to piston 3, at 5, and also to the arm 6, at 7. The arm 6, is rigidly mounted on rockshaft 8, which is pivoted in frame 1. The arm 9, is also rigidly attached to rockshaft 8, and pivotally connected to link 10, at 11, which also in turn is pivotally connected to axle clamp 12, at 13.

The valve 14, is held to its seat 15, by means of spring 17, and the screw 18, serves to regulate the tension of spring 17, to supply the proper amount of pressure between valve 14, and seat 15.

When the vehicle is traveling over smooth roads, the position of the arms 9 and 6, link 4, and piston 3, are as shown in full lines, Figures 1 and 5, and when the vehicle passes over an abrupt elevation or hole in the road, the springs of the vehicle are suddenly compressed or extended, as the case may be, and the relation of the position of the axle to the body of the vehicle is suddenly changed, rocking arm 9, rockshaft 8, and arm 6, away from the normal position, sliding piston 3, in cylinder 2, toward the rockshaft 8, causing a partial vacuum to be formed in chamber 21, in the end of the cylinder 2, and opening valve 14, allowing the air to pass from the large chamber 22, in frame 1, through the aperture 23, through the openings 24, 24, in valve 14, and through the aperture 25, in screw 18.

It will readily be seen that any movement of arm 9, away from its central or normal position, will slide piston 3, in a direction toward rockshaft 8, with a rapidly accelerating movement by means of the toggle action of arm 6, and link 4, and that any movement of the arm 9, toward its central or normal position will slide the piston 3, away from rockshaft 8, with a rapidly decelerating movement.

After the vehicle springs have been compressed or extended, as mentioned above, there is a recoil action to bring the arm 9, suddenly back to its central or normal position, causing the piston 3, to move away from rockshaft 8, closing the valve 14, and rapidly compressing the air in chamber 21, which resists the movement of arm 9, as it moves in either direction toward its normal position, thus checking the reflex action of the vehicle spring. If the arm 9, is held exactly in its central position, so that the arm 6, and link 4, are directly in line, the force of the air compressed in chamber 21, will have no tendency to move arm 9, in either direction from its central position, but if arm 9, is not held exactly in central position, the arm 6, and link 4, will move slightly out of line, and the compressed air in chamber 21, would exert a force to move arm 9, rapidly away from its central position.

To prevent this objectionable action, I have introduced tripping devices, shown in Figures 1, 5 and 6, to open a valve as the piston nears the extreme end of its travel, releasing the air in chamber 21, thus relieving the moving parts of this undesirable force, which would tend to cause a vibrating movement of the vehicle body, if not prevented.

As the piston 3, Fig. 1, nears the extreme position of its travel away from rockshaft 8, the beveled surface 26, of the valve lifter 27, forces the valve 14, slightly away from its seat 15, by means of the relative upward movement of sliding pin 28, acting on the beveled surface 31, of the valve lifter 27. The sliding pin 28, is actuated by the tripping screw est in cap 19.

As the vehicle wheels engage a protrusion in the road, the axle 12, link 10, and pivot 11, of the arm 9, are suddenly raised, rocking shaft 8, and arms 6 and 9, in an anticlockwise direction, as shown by dotted lines, Figures 1 and 2, sliding the piston 3, in cylinder 2, toward the shaft 8, opening the valve 14, which allows air to pass from chamber 22, to chamber 21. This movement takes place with no resistance except the friction of the moving parts, but when the spring tends to retract and suddenly raise the body of the vehicle, the arms 9 and 6, and shaft 8, are rapidly rocked in a clockwise direction toward their normal position, and as the piston 3, is near its extreme position, the toggle action of link 4, imparts a rapid movement to piston 3, closing the valve 14, and rapidly compressing the air in chamber 21, which resists the return of the parts to normal position, modifying the reflex movement of the springs which tends to suddenly raise the body of the vehicle.

When the vehicle wheels drop into a hole in the road, the arms 9 and 6, and shaft 8, are rocked clockwise from their normal position, as shown in Fig. 6, again sliding the piston 3, in cylinder 2, toward shaft 8, opening the valve 14, as before, and when the reflex action of the spring takes place, in conjunction with gravity, to suddenly force the body downward, the piston 3, is again forced away from shaft 8, closing the valve 14, and compressing the air in chamber 21, as before, resisting the upward movement of arm 9, thus preventing the sudden drop of the vehicle body. When the wheels engage the opposite side of the hole in the road, the same action takes place in the moving parts of the absorber as when the wheels engage a protrusion, described above, thus checking the reflex action of the vehicle springs which tend to suddenly raise the body of the vehicle.

Another preferred form of air control mechanism is shown in Fig. 5. The valve 32, operates in a similar manner to that of the valve 14, except that it is not tripped to relieve the air pressure. The safety valve 33, is firmly held to its seat 34, by means of the spring 35, the adjusting screw 36, being employed to adjust the spring pressure and thereby to adjust the amount of air pressure and resistance offered to piston 3. By means of this adjustment, the absorber is adapted to properly control the various abnormal movements of different vehicle springs. The tripping screw 30, opens safety valve 33, as the piston 3, nears the end of its stroke, relieving the air pressure as before.

Referring more especially to Figs. 1 and 6. It will be seen that the lever 9 has an unrestricted zone of movement in either direction near its central position during the time that the pressure of the fluid in chamber 21 is released, and also is unrestricted in its movement in either direction away from its unrestricted zone and is resisted during its movement in either direction toward its unrestricted zone, thus communicating a similar action to the vehicle spring thru rod 10 and vehicle axle.

The tripping screws 29 and 39 may be adjusted forward or back so as to open the valves 14 and 38 respectively sooner or later during the stroke of the piston which regulates the amount of free action allowed to the lever 9 near its central position, thus regulating the amount of unrestricted movement of the vehicle spring at its normal position. The screws 29 and 39 may be adjusted back far enough to allow the resistance of the compressed gas to exert its force on lever 9, to the extreme end of the piston stroke thus eliminating the unrestricted zone mentioned above.

When the piston 3, is at the beginning of its compression stroke the arm 6, and link 4, are in their angular position and as the lever 9, is operated to move the piston 3, downward this angular movement imparts a very rapid movement to the piston 3, quickly compressing the fluid; and as the toggle formed by arm 6, and link 4, is in position to convert a slight pressure on piston 3, to a much greater pressure on arm 9, this pressure is exerted at the point of vehicle spring movement required. It is true that the piston pressure is increased as it moves downward but this is more than offset by the action of the toggle as it lengthens or straightens out and the slight leakage of fluid by the piston so that the resistance offered to lever 9, decreases as the parts near their normal position thus imparting a decreasing movement to the vehicle spring.

In many cases, this safety valve adjustment will be such as to allow enough air to escape to overcome the objectionable reaction of the compressed air on the moving parts heretofore mentioned, without tripping a valve. In Fig. 6, the valve 37, acts the same as valve 32, and the safety valve 38, is the same as safety valve 33, except that the valve is located in the piston instead of in the cap. The tripping screw 39, may be adjusted back far enough to miss the valve 38, when the adjustment of valve 38, is such as to allow sufficient gas to escape to overcome the reactive action on the moving parts, as above mentioned.

I am aware that many arrangements of parts may be employed to accomplish the same results as described in the foregoing. The intake valve could be installed in the body and communicate with the atmosphere outside instead of being located in the pistion; the valve could be tripped at the beginning of the return stroke instead of at the end of the compression stroke; other means than a toggle could be employed to operate piston 3; a passage could be provided in the body 1, to allow the escape of the fluid from the compression chamber 21, back into the suction chamber instead of employing a valve and many other mechanisms could be employed without departing from the spirit and scope of my invention.

What I claim as new is set forth in the following claims:—

1. In combination with a vehicle body, running gear and spring, of a shock absorber comprising two elements relatively movable in relation to each other, one of said elements being adapted to be connected to the vehicle body and the other to the running gear, and means to resist the relative movement of the two elements in such a manner that the vehicle spring is adapted to contract and expand freely within an unrestricted zone of movement near its normal position, and in either direction away from its unrestricted zone, and checked in its movements in either direction toward its unrestricted zone.

2. In combination with a vehicle body, running gear and spring, of a shock absorber comprising two elements relatively movable in relation to each other, one of said elements being adapted to be connected to the vehicle body and the other to the running gear, and means to resist the relative movement of the two elements in such a manner that the vehicle spring is adapted to contract and expand freely within an unrestricted zone of movement near its normal position, and in either direction away from its unrestricted zone, checked in its movements in either direction toward its unrestricted zone, and means to adjust the amplitude of the unrestricted zone.

3. In a shock absorber, a body element, a piston adapted to travel in the body element forming a compression chamber and suction chamber, a valve co-operating with the piston to compress a fluid in the body element, means to release the fluid from the compression chamber to the suction chamber, and means to adjust said release in relation to the position of the piston.

4. In a shock absorber, a body element, a piston to reciprocate in the body element, a valve co-operating with the piston to compress a gas, means to impart an accelerating movement to the piston during its suction stroke, and a decelerating movement during its compression stroke, and means to release the compressed gas when the piston is near the end of its travel.

5. In combination with a vehicle body, running gear and spring, of a shock absorber comprising two elements relatively movable in relation to each other, one of said elements being adapted to be connected to the vehicle body and the other to the running gear, and means to resist the relative movement of the two elements in such a manner that the vehicle spring is adapted to contract and expand freely within an unrestricted zone of movement near its normal position, and in either direction away from its unrestricted zone, and checked in its movements in either direction toward its unrestricted zone, said resistance decreasing and becoming nil as the unrestricted zone is reached.

6. In a shock absorber, a body element, a piston to reciprocate in the body element, a rockshaft, a valve adapted to co-operate with the piston to compress a gas, means to operate the piston by the rockshaft, and means to release the excess pressure of the gas.

7. In a shock absorber, a body element, a piston to reciprocate in the body element, a rockshaft, a valve adapted to co-operate with the piston to compress a gas, means to operate the piston from the rockshaft, and means to release the compressed gas when the piston is near the end of its travel.

8. In a shock absorber, comprising a body element, and piston element, adapted to travel freely in the body element in one direction and means to resist its movement in the other direction of its travel, means to release said resistance, and means to adjust the position of said release relative to the movement of the piston.

9. In a shock absorber, a body element, a piston adapted to reciprocate in the body element, a valve co-operating with the piston to compress a gas in the body element, means to impart an accelerating movement to the piston during its suction stroke and a decelerating movement during its compression stroke and means to regulate the tension of the gas.

10. In a shock absorber, a body element, a piston to reciprocate in the body element, a valve adapted to co-operate with the piston to compress a gas, means to impart an accelerating movement to the piston during its suction stroke, and a decelerating movement during its compression stroke, and means to relieve the excess pressure of the gas.

11. In a shock absorber, a body element, a piston adapted to travel in the body element, a toggle to impart a reciprocatory movement to the piston, a valve adapted to co-operate with the piston to compress a gas, and means to release the compressed gas when the piston is near the end of its travel.

12. In a shock absorber, a body element, a piston to reciprocate in the body element, a toggle adapted to impart reciprocating motion to the piston, a valve co-operating with the piston to compress a gas in the body element and means to relieve the excess pressure of the gas.

13. In a shock absorber, a body element, a piston adapted to travel in the body element, a toggle adapted to impart a reciprocatory movement to the piston, a valve co-operating with the piston to compress a gas in the body element and means to adjust the tension of the gas.

14. In a shock absorber, a body element, a piston adapted to reciprocate in the body element, a valve co-operating with the piston to compress a gas in the body element, means to operate the piston and means to trip the valve while the piston is near the end of its stroke to release the compressed gas.

15. In a shock absorber, a body element, a piston adapted to reciprocate in the body element, a valve co-operating with the piston to compress a gas, a safety valve to release the excess pressure as the piston nears the end of its stroke and means to operate the piston.

16. In a shock absorber, a body element, a piston adapted to reciprocate in the body element, a valve co-operating with the piston to compress a gas in the body element, an adjustable safety valve to regulate the pressure of the gas at will, means to operate the piston and means to open the safety valve to release the gas while the piston is near the end of its stroke.

17. In combination with a vehicle body, running gear and spring, of a shock absorber comprising two elements relatively movable to each other, one of said elements being adapted to be connected to the vehicle body and the other to the running gear, and means to resist the relative movements of the two elements in such a manner that the vehicle spring is adapted to expand or contract freely within an unrestricted zone near its normal position, and as it moves away from its unrestricted zone, and is checked as it moves toward its unrestricted zone.

18. In combination with a vehicle body, running gear and spring, of a shock absorber comprising two elements movable relative to each other, one of said elements being adapted to be connected to the vehicle body and the other to the running gear, and means to resist the relative movement of the two elements in such a manner that the vehicle spring is adapted to expand or contract in a direction away from its normal position freely, but will be decreasingly resisted as it expands or contracts toward its normal position.

In witness whereof I hereunto set my hand.

HENRY O. FLETCHER.